US011907963B2

(12) United States Patent
Kakugwa et al.

(10) Patent No.: US 11,907,963 B2
(45) Date of Patent: Feb. 20, 2024

(54) ON-DEVICE PRIVACY-PRESERVATION AND PERSONALIZATION

(71) Applicant: International Business Machines Corporation, Armonk, NY (US)

(72) Inventors: Kelvin Kakugwa, San Francisco, CA (US); Joe Latone, San Francisco, CA (US); Nirmit V Desai, Yorktown Heights, NY (US); Shahrokh Daijavad, Morgan Hill, CA (US); Wendy Chong, Carmel, NY (US); Heather D Achilles, Gilmanton, NH (US); Dinesh C Verma, New Castle, NY (US); Bijan Davari, Mahapac, NY (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 16/666,486

(22) Filed: Oct. 29, 2019

(65) Prior Publication Data

US 2021/0126904 A1 Apr. 29, 2021

(51) Int. Cl.
*G06Q 30/00* (2023.01)
*G06Q 30/0204* (2023.01)
(Continued)

(52) U.S. Cl.
CPC ..... *G06Q 30/0204* (2013.01); *G06F 16/9535* (2019.01); *G06F 18/214* (2023.01);
(Continued)

(58) Field of Classification Search
None
See application file for complete search history.

(56) References Cited

U.S. PATENT DOCUMENTS 6,029,195 A * 2/2000 Herz ................ H04N 21/25891
348/E7.071
6,266,649 B1 * 7/2001 Linden .................... G06Q 30/02
705/26.7
(Continued)

FOREIGN PATENT DOCUMENTS

JP 2009223415 A * 10/2009 ............. G06F 19/00
JP 2016115345 A * 6/2016 ......... G06Q 30/0201
JP 2019174995 A * 10/2019 ............. G06F 21/62

OTHER PUBLICATIONS

Lane. "Privacy, Big Data, and the Public Good: Frameworks for Engagement". (Jan. 15, 2012). Retrieved online May 1, 2022. http://wpressutexas.net/cs378h/images/b/b3/LaneEtAlPrivacyBigDataAndThePublicGood.pdf.noaccess (Year: 2012).*

(Continued)

*Primary Examiner* — James A Reagan
(74) *Attorney, Agent, or Firm* — Patterson + Sheridan, LLP

(57) ABSTRACT

Personalization with on-device privacy preservation is provided by receiving, at a user device, a generalized recommendation from a remote provider backend, which include a plurality of candidate items responsive to a request from an application running on the user device; generating a plurality of candidate vectors corresponding to the plurality of candidate items representing a corresponding candidate item in a binary format across a plurality of metrics associated with the plurality of candidate items; generating a user vector based on personal data stored on the user device, the user vector representing a user in a binary format across one or more metrics associated with the personal data; determining interaction propensities based on the user vector and the plurality of candidate vectors according to a global model run on the user device; and displaying, on the user device, (Continued)

the plurality of candidate items according to the interaction propensities.

20 Claims, 5 Drawing Sheets

(51) Int. Cl.
H04L 9/40 (2022.01)
G06F 16/9535 (2019.01)
G06Q 30/0601 (2023.01)
G06N 3/02 (2006.01)
G06F 18/214 (2023.01)

(52) U.S. Cl.
CPC ........... *G06N 3/02* (2013.01); *G06Q 30/0631* (2013.01); *H04L 63/0407* (2013.01); *H04L 2463/102* (2013.01)

(56) References Cited

U.S. PATENT DOCUMENTS

| | | | | |
|---|---|---|---|---|
| 6,321,221 | B1* | 11/2001 | Bieganski | G06F 16/335 707/999.005 |
| 6,760,324 | B1* | 7/2004 | Scott | H04L 45/42 370/352 |
| 7,123,608 | B1* | 10/2006 | Scott | H04L 67/30 370/353 |
| 7,457,279 | B1* | 11/2008 | Scott | H04L 45/3065 709/219 |
| 7,720,723 | B2* | 5/2010 | Dicker | G06Q 30/0633 705/14.51 |
| 8,401,911 | B1* | 3/2013 | Chu | G06Q 20/18 705/26.7 |
| 8,478,664 | B1* | 7/2013 | Xavier | G06Q 30/0631 705/26.7 |
| 8,498,573 | B2* | 7/2013 | Eisinger | H04W 48/08 455/414.1 |
| 8,533,067 | B1* | 9/2013 | Kane, Jr. | G06Q 30/02 705/26.7 |
| 8,688,732 | B1* | 4/2014 | Rajyaguru | G06Q 30/02 705/26.7 |
| 8,762,859 | B2* | 6/2014 | Macadaan | G06F 16/951 715/811 |
| 8,805,882 | B2* | 8/2014 | Lewis | G06F 15/16 705/346 |
| 8,819,850 | B2* | 8/2014 | Chien | G06F 3/04842 726/19 |
| 9,246,922 | B2* | 1/2016 | Lewis | H04L 63/107 |
| 9,342,708 | B2* | 5/2016 | Chien | H04W 12/08 |
| 9,785,785 | B2 | 10/2017 | O'Hare et al. | |
| 10,049,221 | B2* | 8/2018 | Chien | H04W 12/08 |
| 10,049,353 | B2 | 8/2018 | Lopez | |
| 10,096,025 | B2 | 10/2018 | Desai et al. | |
| 10,165,108 | B1* | 12/2018 | Douglas | G06Q 30/0262 |
| 10,296,761 | B2* | 5/2019 | Jebara | G06F 21/6245 |
| 10,402,037 | B1* | 9/2019 | Van Gorkom | G06Q 30/0267 |
| 10,425,687 | B1* | 9/2019 | Karnezos | H04H 60/33 |
| 10,841,651 | B1* | 11/2020 | Karnezos | H04L 67/02 |
| 11,061,543 | B1* | 7/2021 | Blatz | G06F 3/04886 |
| 11,120,906 | B2* | 9/2021 | Gandy | G09B 19/00 |
| 11,314,806 | B2* | 4/2022 | Li | G06F 16/65 |
| 2001/0021914 | A1* | 9/2001 | Jacobi | G06Q 30/0601 705/26.1 |
| 2008/0005068 | A1* | 1/2008 | Dumais | G06F 16/24575 |
| 2009/0271209 | A1* | 10/2009 | Krishnamurthy | H04L 63/0407 726/30 |
| 2011/0040756 | A1* | 2/2011 | Jones | G06F 16/951 707/E17.059 |
| 2012/0191758 | A1* | 7/2012 | Lewis | H04L 63/10 707/E17.001 |
| 2013/0117040 | A1* | 5/2013 | James | G16H 20/60 705/2 |
| 2014/0033326 | A1* | 1/2014 | Chien | G06F 21/604 726/28 |
| 2014/0214442 | A1* | 7/2014 | Duffy | G16H 20/30 705/2 |
| 2014/0214443 | A1* | 7/2014 | Duffy | G16H 20/60 705/2 |
| 2014/0222454 | A1* | 8/2014 | Duffy | G16H 20/30 705/2 |
| 2014/0325607 | A1* | 10/2014 | Lewis | G06F 15/16 726/4 |
| 2014/0366161 | A1* | 12/2014 | Chien | G06F 21/604 726/28 |
| 2015/0088598 | A1* | 3/2015 | Acharyya | G06Q 30/00 705/7.29 |
| 2015/0324881 | A1* | 11/2015 | Ouimet | G06Q 30/06 705/14.49 |
| 2016/0253507 | A1* | 9/2016 | Chien | H04W 12/08 726/17 |
| 2016/0292455 | A1* | 10/2016 | Jebara | G06F 16/9535 |
| 2017/0068964 | A1* | 3/2017 | Gevka | G06Q 30/0277 |
| 2017/0161667 | A1* | 6/2017 | Eulenstein | G06Q 50/01 |
| 2017/0235848 | A1* | 8/2017 | Van Dusen | G06N 20/00 705/12 |
| 2017/0270589 | A1* | 9/2017 | Grueneberg | G06Q 20/322 |
| 2017/0277361 | A1* | 9/2017 | Schulze | G06F 3/0484 |
| 2017/0330231 | A1* | 11/2017 | Wayne | G06N 20/00 |
| 2017/0344726 | A1* | 11/2017 | Duffy | A63B 71/0622 |
| 2018/0113985 | A1* | 4/2018 | Gandy | G09B 19/00 |
| 2020/0351374 | A1* | 11/2020 | Eberle | G06F 21/6245 |

OTHER PUBLICATIONS

Erika McCallister et al. "Guide to Protecting the Confidentiality of Personally Identifiable Information (PII) Recommendations of the National Institute of Standards and Technology." Apr. 2010). Retrieved online Sep. 5, 2022.https://nvlpubs.nist.gov/nistpubs/legacy/sp/nistspecialpublication800-122.pdf (Year: 2010).*

Healthit.gov. "Guide to Privacy and Security of Electronic Health Information." (Apr. 2015). Retrieved online Sep. 5, 2022. https://www.healthit.gov/sites/default/files/pdf/privacy/privacy-and-security-guide.pdf (Year: 2015).*

Apple, "iOS Security," iOS Security, Nov. 2018, 95 pages.

Authors et. al.: Disclosed Anonymously, "Recommendation system based on the image and personal profile attributes similarity," IP.com Electronic Publication Date: Jul. 31, 2018, 5 pages.

Authors et. al.: Disclosed Anonymously, "system and methods for recommending personalized multilingual content based on individual preference," IP.com Electronic Publication Date: May 12, 2016, 4 pages.

Authors et. al.: Disclosed Anonymously, "Generating personalized application security policy recommendation based on friend's security policy with similar applications," IP.com Electronic Publication Date: Feb. 26, 2012, 3 pages.

* cited by examiner

ON-DEVICE PRIVACY-PRESERVATION AND PERSONALIZATION

BACKGROUND

The present invention relates to data privacy, and more specifically, to preserving the privacy of a user while enabling personalization based on personal data. Many services offered as applications or forms on the internet build profiles of individual users based on actions taken within the application or website, which are used to tailor recommendations to the individual user. Many users, however, are uncomfortable with the amount and type of data gathered by these services and block the collection and distribution of personalized data, resulting in generalized user experiences for those users who do not provide their personalized data.

SUMMARY

According to one embodiment of the present invention, a method for privacy preservation and personalization is provided, the method comprising: receiving, at a user device, a generalized recommendation from a provider backend remote from the user device, wherein the generalized recommendation includes a plurality of candidate items responsive to a request from an application running on the user device; generating a plurality of candidate vectors corresponding to the plurality of candidate items representing a corresponding candidate item in a binary format across a plurality of metrics associated with the plurality of candidate items; generating a user vector based on personal data stored on the user device, the user vector representing a user in a binary format across one or more metrics associated with the personal data; determining interaction propensities based on the user vector and the plurality of candidate vectors according to a global model run on the user device; and displaying, on the user device, the plurality of candidate items according to the interaction propensities.

According to one embodiment of the present invention, a system for privacy preservation and personalization is provided, the system comprising: a processor; a memory storage device including instructions that when performed by the processor enable a user device to: receive a generalized recommendation from a provider backend remote from the user device, wherein the generalized recommendation includes a plurality of candidate items responsive to a request from an application running on the user device; generate a plurality of candidate vectors corresponding to the plurality of candidate items representing a corresponding candidate item in a binary format across a plurality of metrics associated with the plurality of candidate items; generate a user vector based on personal data stored on the user device, the user vector representing a user in a binary format across one or more metrics associated with the personal data; determine interaction propensities based on the user vector and the plurality of candidate vectors according to a global model run on the user device; and display the plurality of candidate items according to the interaction propensities.

According to one embodiment of the present invention, a computer readable storage device including instructions for privacy preservation and personalization is provided, in which the instructions, when executed by a processor enable the processor to perform an operation comprising: receiving, at a user device, a generalized recommendation from a provider backend remote from the user device, wherein the generalized recommendation includes a plurality of candidate items responsive to a request from an application running on the user device; generating a plurality of candidate vectors corresponding to the plurality of candidate items representing a corresponding candidate item in a binary format across a plurality of metrics associated with the plurality of candidate items; generating a user vector based on personal data stored on the user device, the user vector representing a user in a binary format across one or more metrics associated with the personal data; determining interaction propensities based on the user vector and the plurality of candidate vectors according to a global model run on the user device; and displaying, on the user device, the plurality of candidate items according to the interaction propensities.

DETAILED DESCRIPTION

Figure 1:
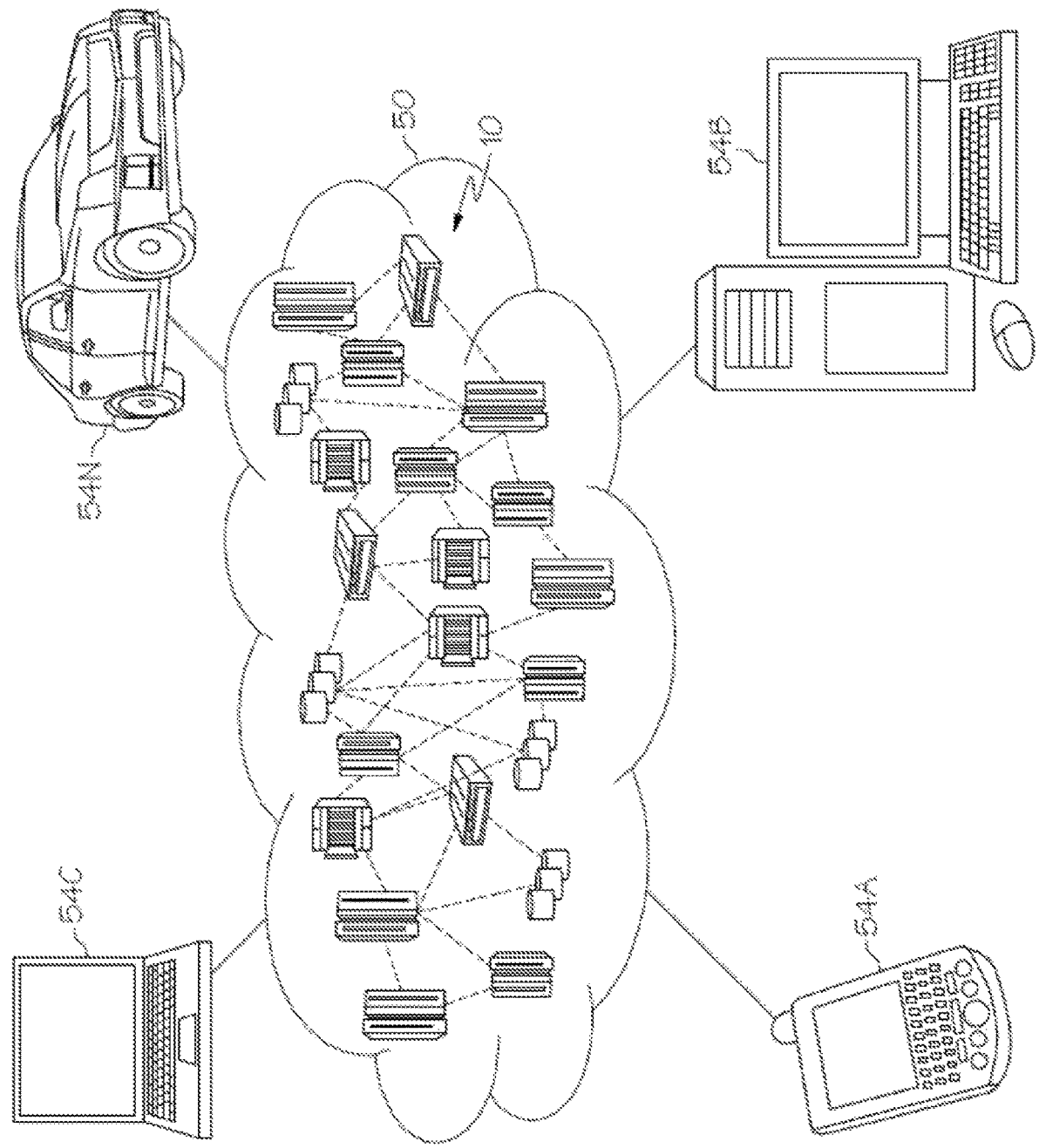
FIG. 1 depicts a cloud computing environment, according to embodiments of the present disclosure.

The present disclosure provides for personalization of results based on user preferences while protecting user's personal data, via anonymized recommendations using an on-device vault of personal data controlled by the user. Instead of allowing applications on the user's device to report data back for collection by a remote service, the vault acts as a repository for sensitive user data on the user device. A global model for recommendations is provided to the user device, which subsequently uses data extracted from the user vault to prioritize different recommendations without exposing the data points that inform that recommendation to an external party.

For example, consider two users, each using a vault on an associated user device for protecting their personalized data sets. A first user may access a shopping application to search for product X, and particularly desires brand Y of product X, due to trust in the manufacturer's high quality. A second user may also access the shopping application to search for product X, and particularly desires brand Y for health reasons that the second user wishes to keep private. By storing the sensitive user data in the vault, neither user provides the inputs for why brand Y is desired over other brands of product X (perceived high quality versus health concerns). However, by supplying the sensitive data to the global model on the users' individual devices, the shopping application is more effective in recommending the desired items to the users. Accordingly, by localizing the use of sensitive or personal data, the users may be assured of data privacy while benefiting from personalization of results.

In another example, consider a user with a temporary interest in a product or service, such as a gift for an acquaintance that would never be purchased for oneself or a one-time purchase. A remote service may collect data on the user related to the purchase and continue offering recommendations based on the atypical purchase, which the user may find aggravating or embarrassing over time. Instead, by anonymizing the user's actions and controlling the release of personalized data via the vault, a user may terminate recommendations related to the temporary interest at a time of the user's choosing, allowing for better recommendations for the user's current interests.

The personalized data vault, and the use thereof, can therefore improve the security of user data, the comfort of the user in providing and using personal data, and the effectiveness of how that user data is used.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
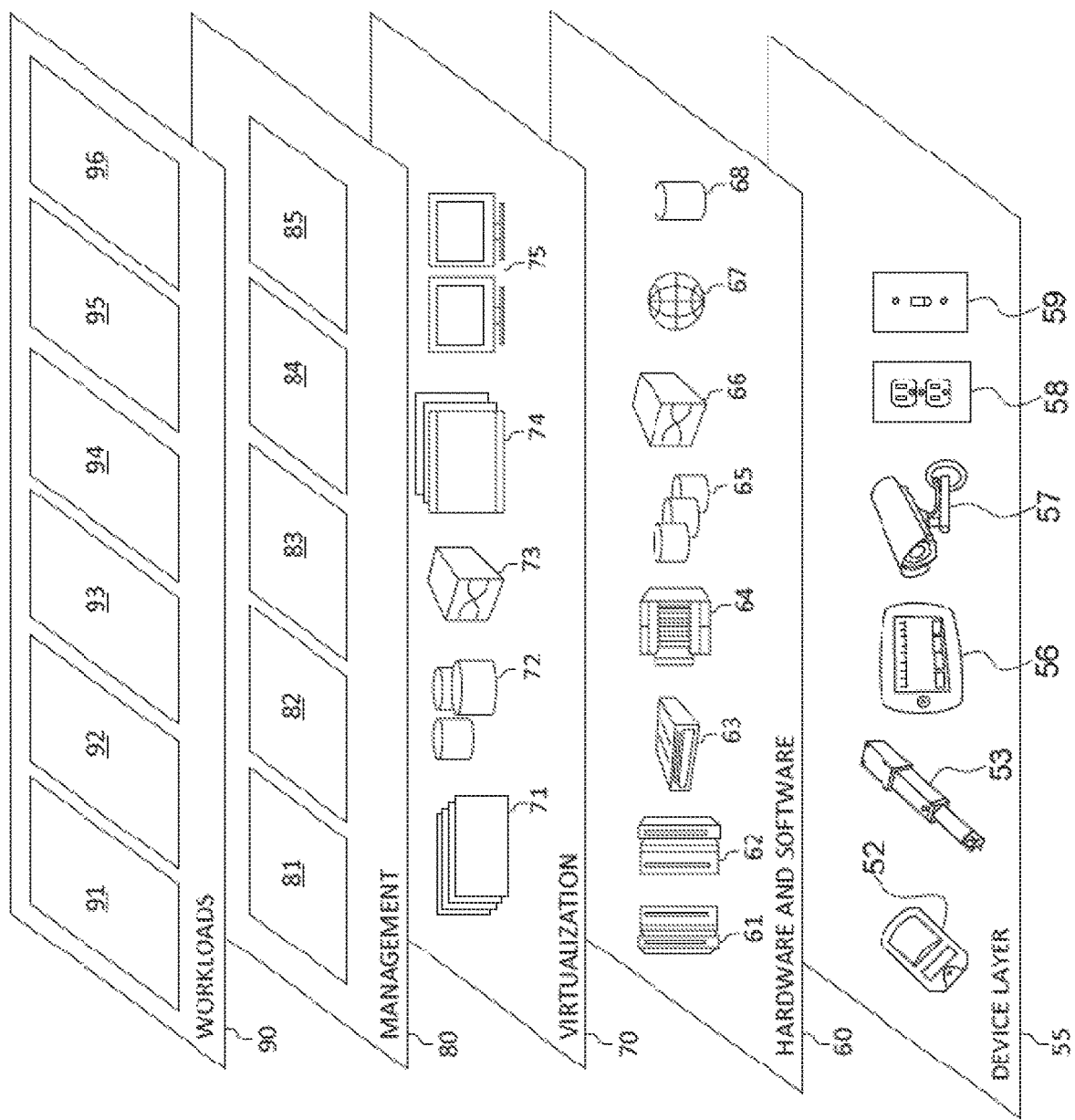
FIG. 2 depicts abstraction model layers, according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

Figure 3:
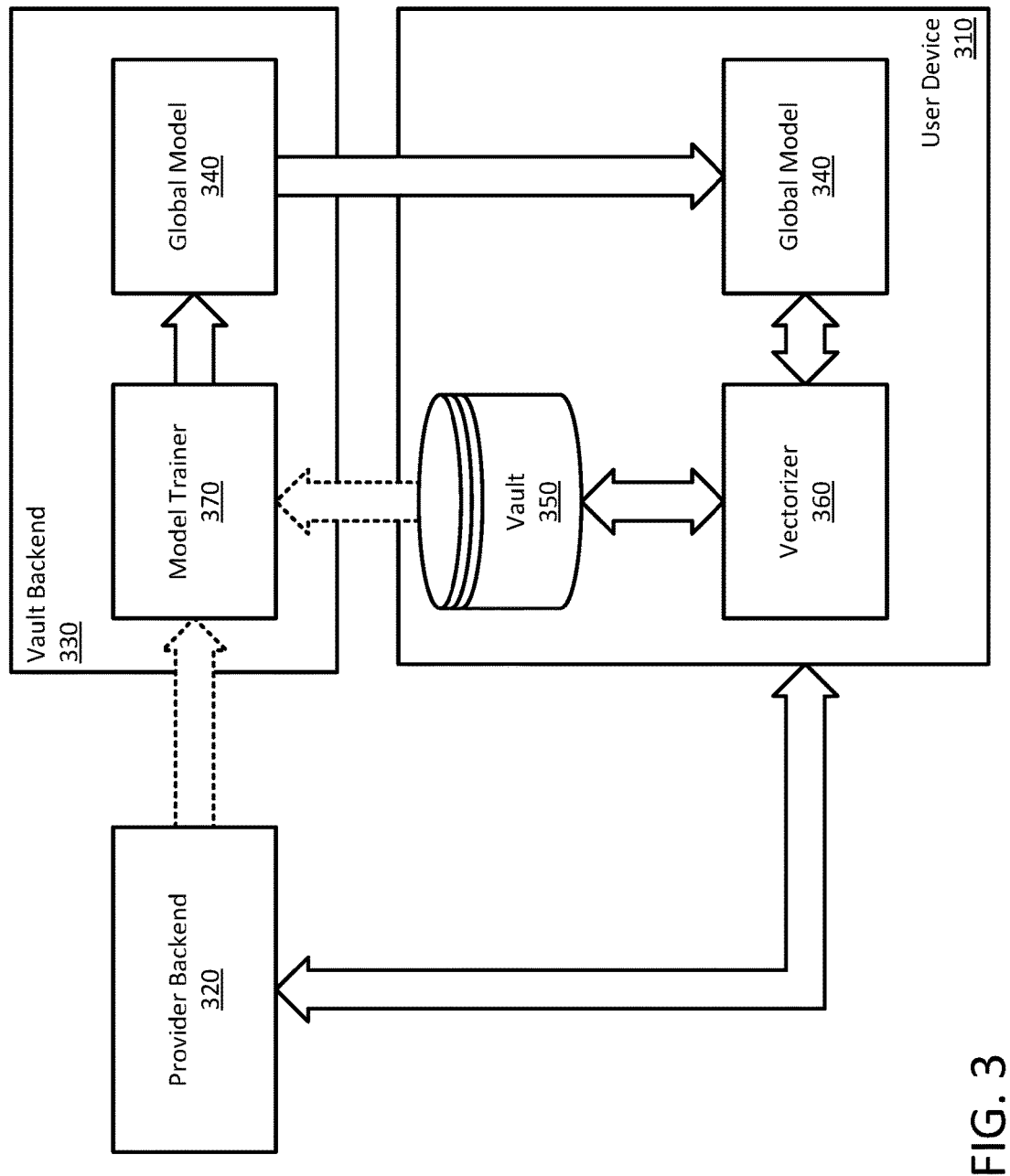
FIG. 3 illustrates an environment in which privacy-protected personalization may be performed, according to embodiments of the present disclosure.

FIG. 3 illustrates an environment 300 in which privacy-protected personalization may be performed, according to embodiments of the present disclosure. The environment includes a user device 310, on which personal data are collected and used to generate personalized results for a user of the user device 310. The user device 310 communicates with an application/service provider backend 320 (also referred to as a remote service) over a network (such as the Internet) to send requests and receive responses, such as, for example, search requests and candidate responses. The user device 310 also communicates with a remote vault backend 330 to receive a global model 340 for use in personalizing the responses from the provider backend 320 on the user device 310.

The user device 310 may be one of various computing devices, such as, for example, a smart phone, a tablet, a laptop computer, a desktop computer, a personal digital assistant, smart watch, or the like. Example hardware components of a computing device used as a user device 310 are described in greater detail in regard to FIG. 5.

The user device 310 runs various applications and services locally on the processing hardware of the user device 310, and some of these applications and services may send and receive data with various provider backends 320. The provider backend 320 may be one of various computing devices or distributed computing devices (e.g., cloud services) that provide support and processing for a given application running on the user device 310. Although one provider backend 320 is illustrated in FIG. 3, in other embodiments the user device 310 may be in communication over a network (e.g., the Internet) with any number of provider backends 320 associated with corresponding applications running on the user device 310. Various provider backends 320 can provide databases and other services to the user device 310 to access an online store, email application, health and fitness tracker, social media platform, news website, map service, or the like.

A provider backend 320 may provide various results for the requests sent from a locally run application, which may be personalized to the user device 310 based on the personal data known to the provider backend 320 for the user of the user device 310. For example, when provided with a query for "restaurants" from the user device 310, the provider backend 320 may respond with a list of restaurants within an X kilometer radius of a known location of the user device 310, may respond with restaurants meeting a known dietary requirement of the user, may respond with favorite restaurants ranked higher than avoided restaurants based on known prior dining patterns of the user, etc., when such data are available to the provider backend 320. The provider backend 320 may obtain these data over time via a user account (e.g., the user logs into an account that logs activities) or by requesting the data from the user device 310 to identify the user's preferences or data to identify a cohort that the user belongs to that is associated with certain preferences.

When the provider backend 320 does not have data about the user, the results to a request from the user device 310 are referred to as "generalized recommendations" or a similar term to indicate that the results are not personalized to a given user or cohort that the user is believed to belong to, but are generalized to be applicable to any user or a broad set of users. For example, when provided with a query for "restaurants" from the user device 310 without a location for the user device 310, the provider backend 320 may return a generalized recommendation of the most popular restaurants in the world, which may not be particularly useful for a user looking for nearby restaurants. Accordingly, to receive personalized results, a user may share some personal data with the provider backend 320 for the provider backend 320 to filter and rank the recommendations according to the user's preferences.

Some of the data used to identify the user's preferences can include a location of the user device 310, a user age, a user income, a user profession, a user health condition, a user brand-loyalty, etc. In other examples, user behaviors in the local application (e.g., selecting search result A rather than search result B), dwell time on a page, rhythm and method of input (e.g., keyboard keystroke rate, touch screen speed of entry), method of payment, account logins (including concurrent account logins from other applications), etc., can be gathered for use as preference identifying data.

Some users may prefer not to share such data (or share only a subset of such data) with the provider backend 320, and thus limit the ability of the provider backend 320 to personalize results for the user. Instead, the user may personalize results on the user device 310 or anonymize the data provided to the provider backend 320 via the vault 350, vectorizer 360, and global model 340 to receive personalized results.

The vault 350 is a secure data storage entity that stores personally identifiable information and other data that the user deems as private or potentially private, and holds these data for local use according to user permissions. For example, a user may permit the use of location data, but deny the use of health condition data, or may allow the use of age range data, but not specific age date (e.g., the user is between A-B years old, but not that that user is C years old). In another example, personal data may relate to previous interactions or purchases that may inform further interactions or purchases, such as buying a hammer may indicate that nails may be purchased in the future, or searching for "VHS" may indicate that a future search for "tape" may be more related to video tape than to adhesive tape. The data in the vault 350 may be collected over time based on user interactions with various applications, or may be specifically added to or removed from the vault 350 by user input. In various embodiments, each user profile on the user device 310 is associated with a unique vault 350, but a vault 350 may be configured to share data between user devices 310. For example, an individual's smart phone and desktop computer may share data between respective vaults 350 to provide a similar user experience across multiple user devices 310 associated with one person.

In some embodiments, when the provider backend 320 returns a generalized recommendation, the vectorizer 360 creates candidate vectors of each item in the generalized recommendation. In other embodiments, the provider backend 320 includes candidate vectors for the items in the generalized recommendation sent to the user device 310. Each of the candidate vectors represent one item from the generalized recommendation, which allows the global model 340 to identify related items and to sort through items that may or may not be of interest or relevant to the user without sharing (or sharing a reduced subset of) personal data with the provider backend 320. The candidate vectors represent various features or metrics of the items in a binary format to illustrate relations between different items. For example, a hammer may be represented as a vector of [1, 1] and a screw driver may be represented as [1, 0] to indicate that both are hand tools (e.g., [1, x]), but that the mode of operation is different (e.g., torqueing [x, 0] or impacting [x, 1]. Similarly, nails may be represented as a vector of [0, 1] and screws as a vector of [0, 0], which shows that neither are hand tools (e.g., [0, x]), but that each has a matched mode of operation to the corresponding hammer or screw driver. The vectorizer 360 can be trained as a machine learning model to identify various features of items, and expand or update the vector representation as necessary to describe new features as those features are learned of. For example, each of the above hardware items may have a price-range field (e.g., costs more than X=true) that may be updated as prices fluctuate for those items.

To enable the global model 340 to personalize the generalized recommendations on the user device 310, the vectorizer 360 creates a user vector based on the data from the vault 350 that the user allows an application to access. The user vector can anonymize or generalize the user's personal data (e.g., providing an age range despite a birthdate being present in the vault 350, providing a metropolitan area as a location despite a precise set of Global Positioning System (GPS) coordinates being present in the vault 350), and enables the global model 340 to compare the items listed in a generalized recommendation from the provider backend 320 against characteristics of the user. The user vector identifies, in a binary format, various features or metrics from the personal data from the vault, such as, for example, whether a given condition about the user is true and shared (e.g., as a 1) or false, unknown, or unshared (e.g., as a 0). Although the provider backend 320 may learn via user interaction with or selection of a recommended item from a list of candidate items, the user's personal details that may affect the reasoning why that user selected the given item is shielded from the provider backend 320. For example, the provider backend 320 may learn that a user selects a vegan restaurant from a list of candidate restaurants, but will not know whether the user selected the restaurant because: the user is vegan, is not vegan but has a friend who is vegan, is on a diet, selected the closest restaurant, the restaurant is within a desired price range, the restaurant offers delivery, etc.

The global model 340 identifies a propensity of the user (based on the user vector) to interact with a given item listed in the generalized recommendation (based on the candidate vector associated therewith). The global model 340 is trained on the vault backend 330, and distributed to one or more user devices 310. In some embodiments, the global model 340 is a neural network that is trained based on data received from the provider backends 320 and/or the vaults 350. A user may optionally provide the user vector and interactions with/selections of candidate items (and candidate vectors thereof) to the vault backend 330 to aid in training the global model 340, but is not so required. Accordingly, the vault backend 330 may be in communication with a plurality of user devices 310 that provide various amounts of data and at various levels of abstraction. For example, a first user device 310 may receive the global model 340 having provided no training data to the vault backend 330, a second user device 310 may receive the global model 340 having provided full access to the vault 350 for use as training data to the vault backend 330, and a third user device 310 may receive the global model 340 having provided a reduced subset of the data in the vault 350 for training data to the vault backend 330.

A model trainer 370 receives the data from the various provider backends 320 and user devices 310 to train the global model 340 with various levels of detail of the user's personal data to predict the user's propensity to select various candidate items from a generalized recommendation.

To incentivize users to share sufficient data with the vault backend 330 to train the global model 340, the global model 340 can be used to identify the potential cohort size that a given set of user data can be used to divide the user into and the benefits to the user in providing a given set of user data. For example, if the user were to provide data to the vault backend 330 that the user is left handed (e.g., to aid in identifying sports equipment, tools, etc. adapted for use by left handed persons), the user could be identified as a member of a cohort of one billion persons. In contrast, if the user provided data that the user is a left handed, vegan, thirty-year old, living in city X, with an allergy to food Y, the user could be identified as one of only a dozen persons. Accordingly, the user may be more comfortable in sharing the first example data set (handedness) than the second example data set (handedness and additional data), but the level of personalization available for the second example data set may be more relevant to the user. Therefore, the global model 340 may identify various breakdowns of the user cohort to the user so that the user can provide data to the model trainer 370 with confidence that the user can maintain a desired level of anonymity. For example, the left-handed user searching for tools suited for left-handed use may supply information that the user is vegan (and may wish to avoid leather grips on those tools) and identify the user as one of a several million persons in a cohort of left-handed vegans. The user may decide whether this tradeoff offers an acceptable level of anonymity for the user versus the ability to train the global model 340 to provide more relevant search results to other users having similar characteristics.

Figure 4:
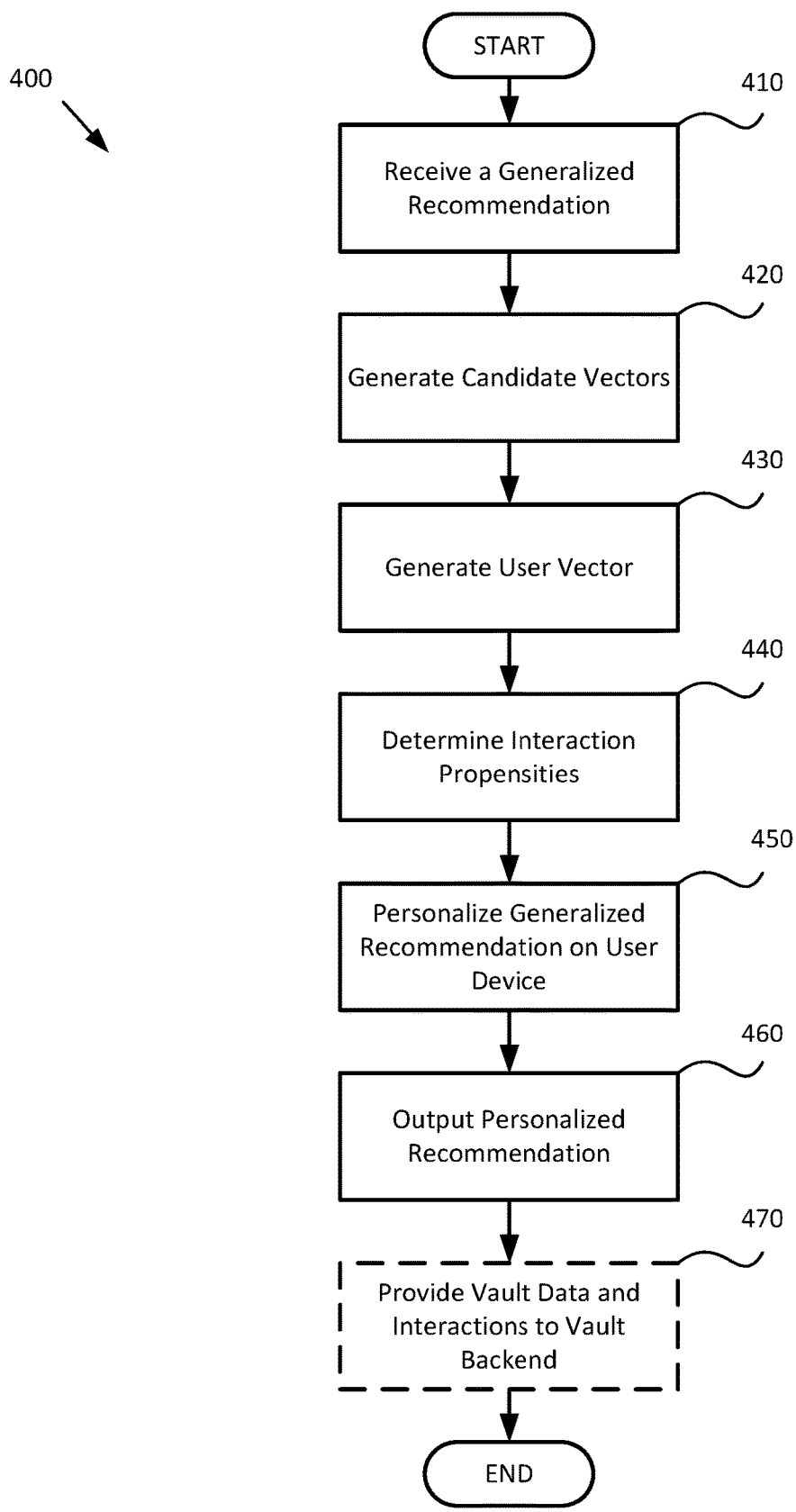
FIG. 4 is a flowchart of a method for on-device personalization and privacy preservation, according to embodiments of the present disclosure.

FIG. 4 is a flowchart of a method 400 for on-device personalization and privacy preservation, according to embodiments of the present disclosure. Method 400 begins with block 410, where a user device 310 receives a generalized recommendation from a provider backend 320 in response to a query or request from the user device 310 to the provider backend 320. The user device 310 includes a vault 350 that stores personal data for a user of the user device 310, which is either not shared to the provider backend 320 or a limited set of the personal data is shared to the provider backend 320. Accordingly, the results in the generalized recommendation are either not personalized to the user or only partially personalized to the user. For example, a user query to an online store for "air filters" may include no personal data, and return generalized recommendations for every item that matches the query terms, while a query for "air filters" that also includes personal data that the user is an apartment dweller (rather than a home owner) may prioritize air filters for use in cars rather than air filters for use in home ventilation systems. Continuing the example, if the vault 350 holds information that the user has pollen allergies that is not supplied to the provider backend 320, the response from the provider backend 320 is at least partially generalized—as the allergy information could be used to personalize the recommendations to include or prioritize hypoallergenic air filters rather than non-hypoallergenic air filters (which are more frequently purchased by the general public due to a lower typical price).

At block 420, a vectorizer 360 on the user device 310 generates candidate vectors for the candidate items included in the generalized recommendation. In some embodiments, block 420 is performed by a vectorizer included in the provider backend 320, and the associated candidate vectors are included in the generalized recommendation per block 410.

At block 430, a vectorizer 360 on the user device 310 generates a user vector based on data included in the vault 350. As the vectorizer 360, vault 350, and global model 340 are all held locally on the user device 310, the vectorizer 360 may access all of the personal data held in the vault 350 without risk of identifying the user described by that data to a third party. In some embodiments, the user may limit what data in the vault 350 (or curate the vault 350 to remove data) is accessible to the vectorizer 360. For example, a user who has purchased diapers as a baby-shower gift may block the vectorizer 360 from using information from that purchase in the user vector and thereby avoid seeing additional recommendations for baby-related items.

At block 440, the global model 340 on the user device 310 compares the user vector and the candidate vectors to determine a propensity for the user to interact with a candidate item (e.g., a relevancy of the candidate item to the user or a person in a cohort with the user). In various embodiments, the global model 340 is a neural network that is trained with data provided from several users (which may include or exclude the user of the user device 310 on which method 400 is performed) and various levels of specificity.

At block 450, the global model 340 on the user device 310 personalizes the generalized recommendation (received per block 410) based on the interaction propensities (determined per block 440). The global model 340 identifies what cohort the user belongs to based on shared characteristics with other users who submitted training data, and identifies or ranks candidate items that are associated with such users. For example, cohorts of users who are identified as living in different regions of the country may be associated with different clothing needs based on localized weather conditions, and thus may have the same list of items in a generalized recommendation sorted and ranked in different ways. For example, a search for "jackets" may yield clothing items with greater insulative properties for users living in colder regions than user in warmer regions, better rain proofing for users living in regions with more precipitation than less precipitation, etc., based on the previous interactions made by other users in the cohort.

At block 460, the user device 310 outputs the personalized recommendation (e.g., via an audio speaker or display device). The personalization of the generalized recommendation can include removing non-relevant items (e.g., items below an interaction propensity threshold) and/or ranking the items for display on the user device 310 to output more relevant items with greater emphasis than less relevant candidate items.

At block 470, the vault 350 optionally provides personal and interaction data to a model trainer 370 in the vault backend 330 to further train/update the global model 340. In some embodiments, the provided data can include the user vector with various data included, excluded, or anonymized (e.g., an age range rather than a specific age) according to user preferences, and also include the choices of which candidate items were selected from a personalized or generalized recommendation. In various embodiments, the user device indicates to the user a predicted cohort size that a given set of data would include the user in if provided to the vault backend 330 (e.g., one of a billion members, or one of only a dozen persons) to assure the user of a desired level of anonymity in proving training data. Additionally, the user device may indicate a level of service available if a given level of specificity is provided in the data (e.g., location data anonymized to a city rather than GPS coordinate set may not be useful in identifying nearby restaurants). Method 400 may then conclude.

Figure 5:
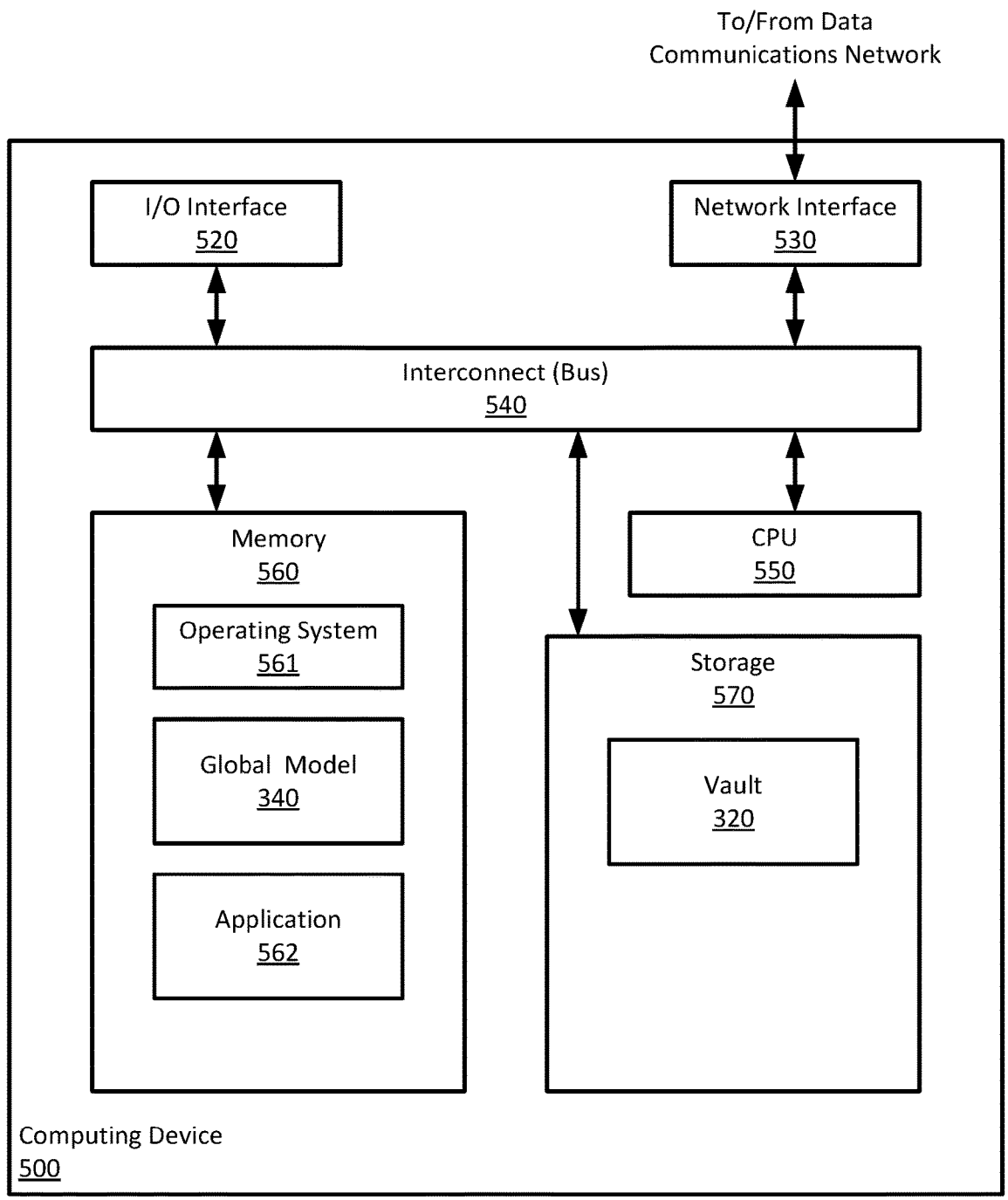
FIG. 5 illustrates a computing system, according to embodiments of the present disclosure.

FIG. 5 illustrates a computing system 500, such as a user device 310 providing a personalized and private user experience as described herein. As shown, the computing system 500 includes, without limitation, a central processing unit (CPU) 550, a network interface 530, an interconnect 540, a memory 560, and storage 570. The computing system 500 may also include an I/O device interface 520 connecting I/O devices 510 (e.g., keyboard, display and mouse devices) to the computing system 500.

The CPU 550 retrieves and executes programming instructions stored in the memory 560. Similarly, the CPU 550 stores and retrieves application data residing in the memory 560. The interconnect 540 facilitates transmission, such as of programming instructions and application data, between the CPU 550, I/O device interface 520, storage 570, network interface or other interconnect 540, and memory 560. CPU 550 is included to be representative of a single CPU, a microprocessor, multiple CPUs, a single CPU having multiple processing cores, and the like. And the memory 560 is generally included to be representative of a random access memory. The storage 570 may be a disk drive storage device. Although shown as a single unit, the storage 570 may be a combination of fixed and/or removable storage devices, such as magnetic disk drives, flash drives, removable memory cards or optical storage, network attached storage (NAS), or a storage area-network (SAN). The storage 570 may include both local storage devices and remote storage devices accessible via the network interface 530.

Further, although shown as a single computing system, one of ordinary skill in the art will recognize that the components of the computing system 500 shown in FIG. 5 may be distributed across multiple computing systems connected by a data communications network.

As illustrated, the memory 560 includes an operating system 561, which may include one or more file systems, and a set of processor instructions to store and retrieve user data in and from the vault 350, which is held in the storage 570. The global model 340 may be run from the memory 560 as part of the operating system 511 or as part of or in conjunction with one or more applications 562 that tailor and personalize results from a remote service for use by the local computing device 500.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving, at a user device, a generalized recommendation from a provider backend remote from the user device, wherein the generalized recommendation includes a plurality of candidate items responsive to a request from an application running on the user device;
generating a plurality of candidate vectors corresponding to the plurality of candidate items representing a corresponding candidate item in a binary format across a plurality of metrics associated with the plurality of candidate items, wherein the binary format for the plurality of candidate vectors comprises a true value or a false value for each of the plurality of metrics based on characteristics of a respective one of the plurality of candidate items;
generating a user vector based on personal data stored on the user device and access settings for the application, the user vector representing a user in a binary format across one or more metrics associated with the personal data, wherein the binary format for the user vector comprises a true value or a false value for each of the one or more metrics based on the personal data, wherein the access settings limit an amount of the personal data accessible by the application and represented in the user vector, and wherein the user vector provides a representation of the personal data with a first level of anonymity;
determining, using a global model comprising a neural network executed on the user device, interaction propensities based on the user vector and the plurality of candidate vectors; and
displaying, on the user device, the plurality of candidate items according to the interaction propensities.

2. The method of claim 1, wherein displaying the plurality of candidate items according to the interaction propensities further comprises:
displaying a subset of less than all of the plurality of candidate items based on a threshold similarity between associated candidate vectors to the user vector.

3. The method of claim 1, wherein the provider backend requests a first data set to provide personalized recommendations, wherein a second data set stored in a vault on the user device is used to generate the user vector, and wherein vault settings indicate what elements of the first data set are retrieved from the vault for use in the second data set.

4. The method of claim 3, wherein the user device indicates a size of a cohort that a given data set from the vault includes the user in.

5. The method of claim 1, wherein a selected portion of the personal data is provided to a vault backend to train the neural network for use as the global model.

6. The method of claim 1, wherein the global model is provided from a vault backend to the user device, wherein collected user data from other devices are used to train the global model.

7. The method of claim 6, wherein the collected user data are provided to the vault backend as anonymized user vectors from the respective other devices.

8. A system comprising:
a processor;
a memory storage device including instructions that when performed by the processor enable a user device to:
receive a generalized recommendation from a provider backend remote from the user device, wherein the generalized recommendation includes a plurality of candidate items responsive to a request from an application running on the user device;
generate a plurality of candidate vectors corresponding to the plurality of candidate items representing a corresponding candidate item in a binary format across a plurality of metrics associated with the plurality of candidate items, wherein the binary format for the plurality of candidate vectors comprises a true value or a false value for each of the plurality of metrics based on characteristics of a respective one of the plurality of candidate items;
generate a user vector based on personal data stored on the user device and access settings for the application, the user vector representing a user in a binary format across one or more metrics associated with the personal data, wherein the binary format for the user vector comprises a true value or a false value for each of the one or more metrics based on the personal data wherein the access settings limit an amount of the personal data accessible by the application and represented in the user vector, and wherein the user vector provides a representation of the personal data with a first level of anonymity;

determine, using a global model comprising a neural network executed on the user device, interaction propensities based on the user vector and the plurality of candidate vectors; and display the plurality of candidate items according to the interaction propensities.

9. The system of claim 8, wherein displaying the plurality of candidate items according to the interaction propensities comprises displaying a subset of less than all of the plurality of candidate items based on a threshold similarity between associated candidate vectors to the user vector.

10. The system of claim 8, wherein the provider backend requests a first data set to provide personalized recommendations, wherein a second data set stored in a vault on the user device is used to generate the user vector, and wherein vault settings indicate what elements of the first data set are retrieved from the vault for use in the second data set.

11. The system of claim 10, wherein the user device indicates a size of a cohort that a given data set from the vault includes the user in.

12. The system of claim 8, wherein a selected portion of the personal data is provided to a vault backend to train the neural network for use as the global model.

13. The system of claim 8, wherein the global model is provided from a vault backend to the user device, wherein collected user data from other devices are used to train the global model.

14. The system of claim 13, wherein the collected user data are provided to the vault backend as anonymized user vectors from the respective other devices.

15. A computer readable storage device including instructions that when executed by a processor enable the processor to perform an operation comprising:

receiving, at a user device, a generalized recommendation from a provider backend remote from the user device, wherein the generalized recommendation includes a plurality of candidate items responsive to a request from an application running on the user device;

generating a plurality of candidate vectors corresponding to the plurality of candidate items representing a corresponding candidate item in a binary format across a plurality of metrics associated with the plurality of candidate items, wherein the binary format for the plurality of candidate vectors comprises a true value or a false value for each of the plurality of metrics based on characteristics of a respective one of the plurality of candidate items;

generating a user vector based on personal data stored on the user device and access settings for the application, the user vector representing a user in a binary format across one or more metrics associated with the personal data, wherein the binary format for the user vector comprises a true value or a false value for each of the one or more metrics based on the personal data wherein the access settings limit an amount of the personal data accessible by the application and represented in the user vector, and wherein the user vector provides a representation of the personal data with a first level of anonymity;

determining, using a global model comprising a neural network executed on the user device, interaction propensities based on the user vector and the plurality of candidate vectors; and displaying, on the user device, the plurality of candidate items according to the interaction propensities.

16. The computer readable storage device of claim 15, wherein displaying the plurality of candidate items according to the interaction propensities further comprises:

displaying a subset of less than all of the plurality of candidate items based on a threshold similarity between associated candidate vectors to the user vector.

17. The computer readable storage device of claim 15, wherein the provider backend requests a first data set to provide personalized recommendations, wherein a second data set stored in a vault on the user device is used to generate the user vector, and wherein vault settings indicate what elements of the first data set are retrieved from the vault for use in the second data set.

18. The computer readable storage device of claim 17, wherein the user device indicates a size of a cohort that a given data set from the vault includes the user in.

19. The computer readable storage device of claim 15, wherein a selected portion of the personal data is provided to a vault backend to train the neural network for use as the global model.

20. The computer readable storage device of claim 15, wherein the global model is provided from a vault backend to the user device, wherein collected user data from other devices are used to train the global model, and wherein the collected user data are provided to the vault backend as anonymized user vectors from the respective other devices.

* * * * *